United States Patent [19]

Blanks

[11] Patent Number: 5,732,446
[45] Date of Patent: Mar. 31, 1998

[54] METAL TIE

[75] Inventor: Steven J. Blanks, Winsford, United Kingdom

[73] Assignee: Rowthorpe P.L.C., United Kingdom

[21] Appl. No.: 693,609

[22] Filed: Aug. 7, 1996

[30] Foreign Application Priority Data

Aug. 16, 1995 [GB] United Kingdom .................. 9516779

[51] Int. Cl.$^6$ .............................. F16L 33/00; B65D 63/08
[52] U.S. Cl. .............................................. 24/25; 24/136 A
[58] Field of Search .......................... 24/21, 25, 20 R, 24/136 A, 115 L, 16 R, 19, 268; 248/74.2

[56] References Cited

U.S. PATENT DOCUMENTS

| | | | |
|---|---|---|---|
| 980,070 | 1/1910 | Swafford | 24/25 |
| 4,074,916 | 2/1978 | Schindler | 24/136 A X |
| 4,366,602 | 1/1983 | Conlon et al. | 24/25 |
| 4,399,592 | 8/1983 | Chopp, Jr. et al. | 24/136 A X |
| 4,935,993 | 6/1990 | Bree | 24/136 A |
| 5,291,637 | 3/1994 | Meyers | 24/25 |

*Primary Examiner*—Peter M. Cuomo
*Assistant Examiner*—Robert J. Sandy
*Attorney, Agent, or Firm*—Ryan, Maki, Mann & Hohenfeldt

[57] ABSTRACT

A metal cable tie includes a locking head formed at one end of an elongate strap. A metal locking ball is contained within the locking head and serves to secure the strap against withdrawing movement when the strap is inserted through the locking head. The ball is inserted into the locking head through a hole. After the ball is inserted, the strap is folded around the locking head to secure the strap to the locking head while blocking the hole to confine the ball within the head. A pair of interengageable barbs formed on the strap engage each other through the hole to secure the strap adjacent the locking head and occlude the hole to keep the ball from falling out. Preferably, the tie is economically and conveniently formed through a stamping and folding operation.

16 Claims, 1 Drawing Sheet

METAL TIE

FIELD OF THE INVENTION

This invention relates generally to cable ties and, more particularly, to metal ties that can be formed into a loop around cables and other objects.

BACKGROUND OF THE INVENTION

Ties that are formable into loops around cables and the like are well known. One such tie comprises an elongate strap extending from an apertured head. In use, the tie is formed into a loop by passing the free end of the strap through the apertured head. A flexible pawl inside the head engages serrations on the strap and prevents the strap from loosening.

An advantage of such ties is that they can be conveniently and economically formed as a one piece plastic molding. However, a disadvantage of plastic ties is that they break relatively easily under load, particularly once the plastic has become brittle. Another disadvantage of plastic ties is that they are unsuitable for use in some environments, such as, for example, where temperature extremes are encountered.

Ties formed from metal are also well-known. Such ties are generally stronger and more suitable for use in some environments. A disadvantage of metal ties is that they cannot be formed as a one-piece molding. One type of metal tie comprises an apertured head, an elongate flexible strap attached to the head and a locking ball captively mounted inside the head. In use, the tie is formed into a loop and the free end of the strap is passed through the apertured head. Once the strap is tightened it is released, thereby causing it to withdraw slightly from the head. This withdrawing movement causes the locking ball to move to a locking position in which it becomes wedged between a wall of the head and the strap, so as to securely lock the strap to the head.

The straps of known metal ties are usually attached to the head during assembly of the tie by folding a flap on one end of the strap over a portion of the head. A barb may be provided on the flap to engage the head and prevent the flap from unfolding when the strap is under load. However, it is relatively easy for the barb to become dislodged such that the strap becomes detached from the head.

SUMMARY OF THE INVENTION

The invention provides a tie including a locking head having a top wall, a bottom wall, an aperture in the bottom wall and a cavity defined between the top wall and the bottom wall. A locking member is disposed in the cavity, and an elongate strap is secured to the locking head by means of first and second barbs on the strap interengaging with each other through the aperture.

The invention also provides a tie including a locking head having a top wall, a bottom wall, an aperture in the bottom wall and a cavity defined between the top wall and the bottom wall. The cavity has an entrance opening and an exit opening. A locking ball is inserted into the cavity through the aperture, and an elongate strap is folded around the aperture after the locking ball has been inserted into the cavity to secure the elongate strap to the locking head and to block the aperture and thereby confine the locking ball in the cavity.

The invention also provides a method of manufacturing a metal tie including the steps of: (a) forming from a sheet of metal a locking head blank having a pair of opposed tabs, each including a cut-out portion, (b) forming from a sheet of metal an elongate strap, (c) shaping the locking head blank into a hollow cavity-defining structure by, in part, folding the tabs of the locking head portion inwardly toward each other so that the tabs define one wall of the cavity and so that the cut-out portions of the tabs cooperate to form an aperture opening into the cavity, (d) inserting a locking member into the cavity through the aperture, and (e) folding one end of the elongate strap over the folded tabs so as to block the aperture and thereby confine the locking member within the cavity.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENT

Figure 1:
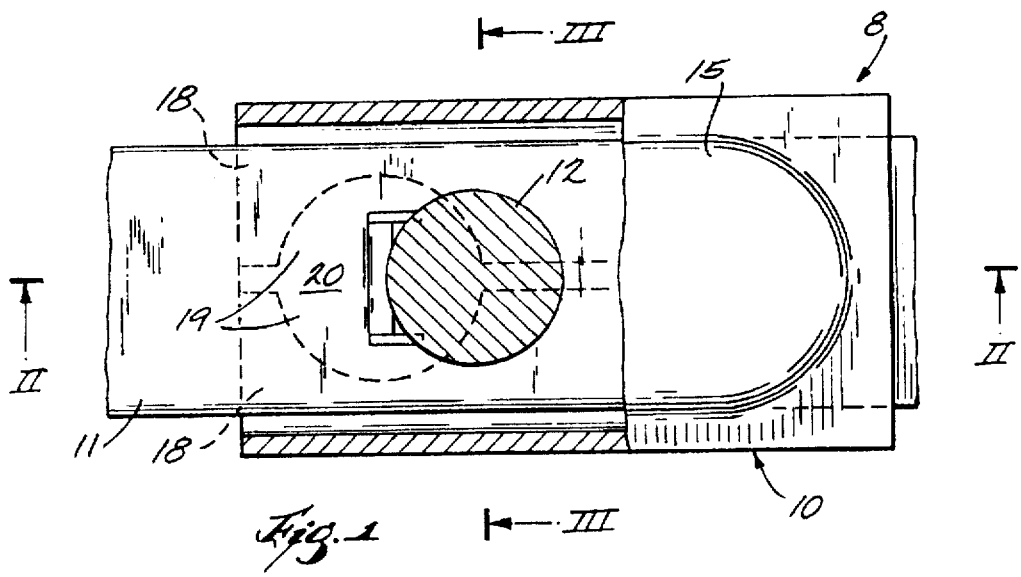
FIG. 1 is a fragmentary plan view, partially in section, of a metal tie embodying various features of the invention.
Figure 2:
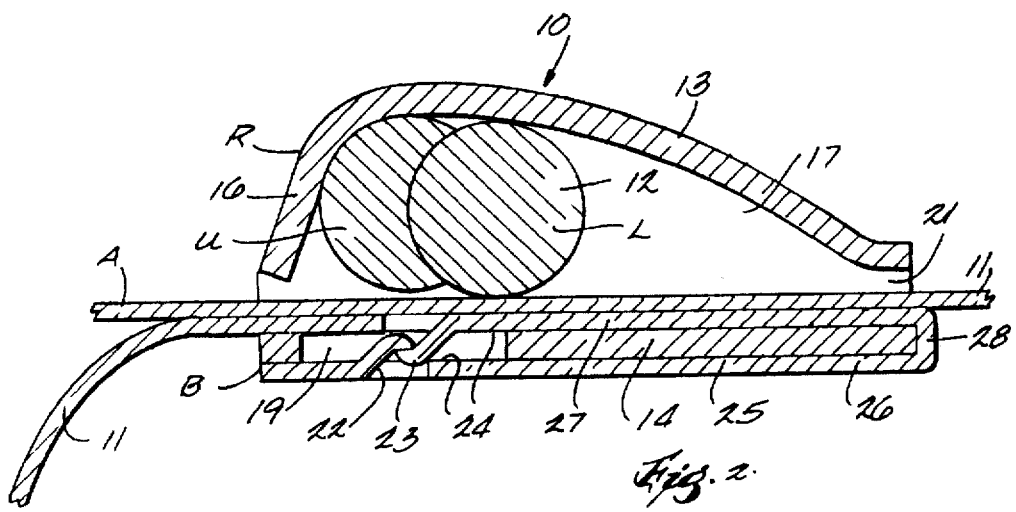
FIG. 2 is a sectional view taken along line II—II of FIG. 1.
Figure 3:
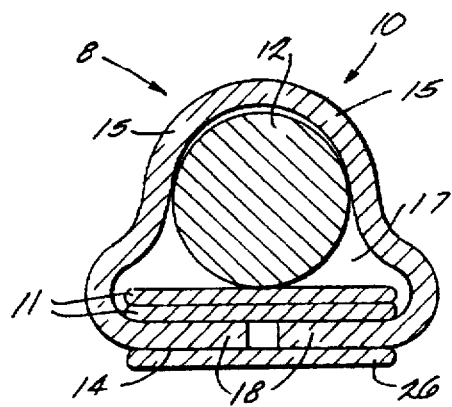
FIG. 3 is a sectional view taken along line III—III of FIG. 1.

Referring to the drawings, a tie 8 embodying various feature of the invention is shown. The tie 8 is preferably formed from stainless steel, however, the tie 8 could be formed from any other type of metal. The tie 8 in unassembled form comprises three pieces—a head 10, an elongate flexible strap 11 and a locking ball 12. In assembled form, the strap 11 is secured to the head 10, and the locking ball 12 is captively mounted within the head 10.

The head 10 comprises an inclined top wall 13, a flat bottom wall 14, opposite side walls 15 and a rear end wall 16. Walls 13, 14, 15 and 16 define an elongate internal cavity 17 inside the head 10. The top and bottom walls 13 and 14 respectively converge toward a front end F of the head 10.

The head 10 is preferably formed by first shaping a locking head "blank" from a sheet of metal. The shape of the locking head blank is predetermined according to the final desired shape and size of the finished locking head. Next, the locking head blank is stamped to form a hollow, which defines the top, side and end walls 13, 15, 16 respectively of the head 10. The bottom wall 14 is subsequently formed by folding inwardly two tabs 18 which extend from respective longitudinal lower edges of the opposite side walls 15. Two semi-circular portions 19 are cut out from the opposed side edges of the tabs 18 so as to form an opening 20 in the bottom wall 14. The opening 20 communicates with the cavity 17 adjacent the rear R of the tie 8. An elongate strap-receiving passage 21 extends through the head 10 from the front F to the rear R of the head 10 and the strap-receiving passage passes through the cavity 17.

The strap 11 comprises an elongate flat metal strip having an end A and end B. The metal strip 11 is preferably stamped to form two barbs 22 and 23 which project outwardly from and transverse to a face 24 of the strap 11. The barbs 22 and 23 are both located near end B of the strap 11. When assembling the tie 8, the strap 11 is manipulated to form a generally U-shaped head-engaging portion 25. The U-shaped head-engaging portion 25 is formed by folding the end B of the strap 11 back on itself through approximately 120° at a point intermediate the two barbs 22 and 23 such that the barbs 22 and 23 project towards each other but do not engage each other. In this orientation, a first arm 26 of the strap 11 is defined by the shorter portion of the strap 11 that was folded through the 120° containing the end B and a second arm 27 is defined by the remaining portion of the strap 11 containing the end A. Barb 22 is on first arm 26 and barb 23 is on second arm 27. A bight 28 connects the first arm 26 to the second arm 27.

In order to assemble the three pieces of the tie 8, the locking ball 12 is inserted into the cavity 17 through the opening 20 in the bottom wall 17. Next, the second arm 27 of the strap 11 is fed through the passage 21, from front F to rear R, until the bight 28 engages the bottom wall 14 and the portion of the second arm 27 of the strap 11 that is in the head 10 abuts the bottom wall 14. The first arm 26 of the strap 11 is then folded generally a further 60° so that the first arm 26 lies against the bottom wall 14 of the head 10 thus causing the two bars 22 and 23 to interengage through the opening 20 of the head 10.

Alternatively, the tie 8 can also be assembled as follows: After the locking ball 12 is inserted into the cavity 17 through the opening 20 in the bottom wall 14, the end A of the strap 11 is fed through the passage 21, from front F to rear R, until the barb 23 is positioned in opening 20. Thereafter, the first arm 26 of the strap 11 is then folded approximately 180° toward the locking head 10 causing the two bars 22 and 23 to interengage through the opening 20 of the head 10 and thus securing the locking head 10 to the strap 11.

After the tie 8 is assembled, the strap 11 is positively locked by the barbs 22 and 23 in a loop around the bottom wall 14 of the head 10 and the head 10 cannot easily become detached from the strap 11. The second arm 27 of the strap 11 also closes the opening 20 in the head 10 so that the locking ball 12 is captively retained in the cavity 17 of the head 10.

In use, the end A of the strap 11 is passed around a bundle of cables or other objects to be secured and thereafter inserted into the strap-receiving passage 21 at the front F of the head 10. The second arm 27 of the strap 11 passes between the locking ball 12 and the floor of the cavity 17 made up of another portion of the strap 11. During insertion of end A of the strap 11 into the head 10, the locking ball 12 is pushed towards the rear of the cavity 17 and thus the strap 11 can be freely pulled through the head 10. Once it has been fully tightened, the strap 11 is allowed to withdraw slightly from the head 10 thus causing the locking ball 12 to move from its unlocked position U at the rear R of the cavity 17 to a locked position L towards the front F of the cavity 17. In its locked position L, the locking ball 12 wedges between the strap 11 and the top wall 13 of the head 10. The locking ball 12 thus engages the strap 11 and prevents it from disengaging from the head 10.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A tie comprising:

a locking head having a top wall, a bottom wall, an aperture in the bottom wall and a cavity defined between the top wall and the bottom wall;

a locking member in the cavity; and an elongate strap secured to the locking head by means of first and second barbs on the strap interengaging with each other through the aperture.

2. A tie as defined in claim 1 wherein the locking member is insertable into the cavity through the aperture before the elongate strap is secured to the locking head.

3. A tie as defined in claim 1 wherein the elongate strap is folded back on itself over opposite sides of the aperture.

4. A tie as defined in claim 1 wherein the locking head and the elongate strap are formed of metal.

5. A tie as defined in claim 1 wherein the aperture is circular.

6. A tie as defined in claim 1 wherein the bottom wall of the locking head is defined by means of two inwardly folded, opposing tabs, each including a cut-out portion defining substantially one-half of the aperture.

7. A tie as set forth in claim 1 wherein the locking member is a rolling ball.

8. A tie comprising:

a locking head having a top wall, a bottom wall, an aperture in the bottom wall and a cavity defined between the top wall and the bottom wall, the cavity having an entrance opening and an exit opening;

a locking ball inserted into the cavity through the aperture; and an elongate strap folded around the aperture after the locking ball has been inserted into the cavity to secure the elongate strap to the locking head and to block the aperture and thereby confine the locking ball in the cavity.

9. A tie as defined in claim 8 wherein the locking head and the elongate strap are formed of metal.

10. A tie as defined in claim 8 wherein the aperture is circular.

11. A tie as defined in claim 8 wherein the locking head is formed from a sheet of metal having a pair of inwardly folded tabs defining the bottom wall, each of the tabs including a cut-out portion that cooperates with the cut-out portion of the opposing tab to define the aperture.

12. A method of manufacturing a metal tie comprising the steps of:

forming from a sheet of metal a locking head blank having a pair of opposed tabs, each including a cut-out portion;

forming from a sheet of metal an elongate strap;

shaping the locking head blank into a hollow cavity-defining structure by, in part, folding the tabs of the locking head blank inwardly toward each other so that the tabs define one wall of the cavity and so that the cut-out portions of the tabs cooperate to form an aperture opening into the cavity;

inserting a locking member into the cavity through the aperture; and folding one end of the elongate strap over the folded tabs so as to block the aperture and thereby confine the locking member within the cavity.

13. A method as defined in claim 12 wherein the step of folding the elongate strap includes the steps of doubling one end of the strap over itself so that the strap lies over both sides of the aperture.

14. A tie comprising:

a locking head having a top wall, a bottom wall, an aperture in the bottom wall and a cavity defined between the top wall and the bottom wall, the cavity having an entrance opening and an exit opening;

a locking ball inserted into the cavity through the aperture; and an elongate strap folded around the aperture after the locking ball has been inserted into the cavity to secure the elongate strap to the locking head and to block the aperture and thereby confine the locking ball in the cavity, the elongate strap being folded around the bottom wall over the aperture and including interengaging members that join through the aperture to secure the elongate strap to the locking head.

15. A tie as defined in claim 14 wherein the interengaging members comprise a pair of interengageable barbs formed on the elongate strap.

16. A method of manufacturing a metal tie comprising the steps of:

forming from a sheet of metal a locking head blank having a pair of opposed tabs, each including a cut-out portion;

forming from a sheet of metal an elongate strap;

shaping the locking head blank into a hollow cavity-defining structure by, in part, folding the tabs of the locking head blank inwardly toward each other so that the tabs define one wall of the cavity and so that the cut-out portions of the tabs cooperate to form an aperture opening into the cavity;

inserting a locking member into the cavity through the aperture; and folding one end of the elongate strap over the folded tabs so as to block the aperture and thereby confine the locking member within the cavity;

forming a pair of longitudinally spaced interengagable barbs on the elongate strap; and folding the elongate strap around the folded tabs so as to interengage the barbs with each other through the aperture.

\* \* \* \* \*